(12) United States Patent
Nguyen et al.

(10) Patent No.: US 7,529,758 B2
(45) Date of Patent: *May 5, 2009

(54) METHOD FOR PRE-PROCESSING MAPPING INFORMATION FOR EFFICIENT DECOMPOSITION OF XML DOCUMENTS

(75) Inventors: Dung Kim Nguyen, San Jose, CA (US); Mayank Pradhan, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 250 days.

This patent is subject to a terminal disclaimer.

(21) Appl. No.: 11/351,467

(22) Filed: Feb. 10, 2006

(65) Prior Publication Data
US 2007/0198543 A1    Aug. 23, 2007

(51) Int. Cl.
*G06F 17/30* (2006.01)
(52) U.S. Cl. ............................ 707/100; 707/102
(58) Field of Classification Search ............. 707/1, 707/6, 10, 110, 100, 101, 102, 103 R, 103 X, 707/103 Y, 103 Z, 104.1; 715/239
See application file for complete search history.

(56) References Cited

U.S. PATENT DOCUMENTS

| | | | |
|---|---|---|---|
| 5,644,776 A | 7/1997 | DeRose et al. | |
| 5,787,449 A | 7/1998 | Vulpe et al. | |
| 6,480,865 B1 | 11/2002 | Lee et al. | |
| 6,606,620 B1 | 8/2003 | Sundaresan et al. | |
| 6,643,633 B2 | 11/2003 | Chau et al. | |
| 6,665,682 B1 | 12/2003 | DeKimpe et al. | |
| 6,687,873 B1 | 2/2004 | Ballantyne et al. | |
| 6,721,727 B2 | 4/2004 | Chau et al. | |
| 6,836,778 B2 | 12/2004 | Manikutty et al. | |
| 7,072,896 B2 | 7/2006 | Lee et al. | |
| 7,096,224 B2 | 8/2006 | Murthy et al. | |
| 7,308,455 B2 | 12/2007 | Dung et al. | |
| 2002/0099687 A1 | 7/2002 | Krishnaprasad et al. | |
| 2002/0123993 A1 | 9/2002 | Chau et al. | |
| 2002/0133484 A1 | 9/2002 | Chau et al. | 707/3 |
| 2002/0133497 A1 | 9/2002 | Draper et al. | |
| 2003/0140308 A1 | 7/2003 | Murthy et al. | |
| 2003/0149934 A1 | 8/2003 | Worden | |
| 2003/0163597 A1 | 8/2003 | Hellman et al. | |
| 2003/0182268 A1 | 9/2003 | Lal | |
| 2003/0204481 A1 | 10/2003 | Lau | |

(Continued)

OTHER PUBLICATIONS

K.Beyer et al., "DB2 goes hybrid: Integrating native XML and XQuery with relational data and SQL", Jan. 17, 2006, IBM system journal, vol. 45, No. 2: http://www.research.ibm.com/journals/sj/452/beyer.html, pp. 1-31.*

(Continued)

*Primary Examiner*—Diane Mizrahi
(74) *Attorney, Agent, or Firm*—Kunzler & McKenzie

(57) ABSTRACT

Methods for pre-processing mapping information for efficient decomposition of an XML document for storage in a database are provided. The method includes receiving a mapping document that describes how all of (or a portion of) an XML document is to be decomposed, transforming the mapping document into a data structure for decomposing an XML document, and making the data persistent for use with a subsequent decomposition operation that decomposes an XML document.

3 Claims, 4 Drawing Sheets

U.S. PATENT DOCUMENTS

| | | | |
|---|---|---|---|
| 2003/0236718 | A1 | 12/2003 | Yang et al. |
| 2003/0237047 | A1 | 12/2003 | Borson |
| 2004/0030701 | A1 | 2/2004 | Vandersluis et al. |
| 2004/0068694 | A1 | 4/2004 | Kaler et al. |
| 2004/0143581 | A1 | 7/2004 | Bohannon et al. |
| 2004/0162833 | A1 | 8/2004 | Jones et al. |
| 2004/0205082 | A1 | 10/2004 | Fontoura et al. ............ 707/101 |
| 2005/0027681 | A1 | 2/2005 | Bernstein et al. |
| 2005/0060332 | A1 | 3/2005 | Bernstein et al. |
| 2005/0160110 | A1* | 7/2005 | Charlet et al. ............... 707/102 |
| 2005/0177578 | A1 | 8/2005 | Chen et al. |
| 2005/0278358 | A1 | 12/2005 | Doughan |
| 2006/0031757 | A9 | 2/2006 | Vincent, III |
| 2006/0136435 | A1* | 6/2006 | Nguyen et al. .............. 707/100 |
| 2006/0136483 | A1 | 6/2006 | Nguyen et al. |
| 2006/0206523 | A1* | 9/2006 | Gaurav et al. ............ 707/104.1 |
| 2007/0067343 | A1 | 3/2007 | Mihaila et al. |
| 2007/0198543 | A1 | 8/2007 | Nguyen et al. |

OTHER PUBLICATIONS

XML Schema Part 1: Structures Second Edition, W3C Recommendation, Oct. 28, 2004, http://www.w3.org/TR/xmlschema-1/.

XML Schema Part 2: Datatypes Second Edition, W3C Recommendation 28, 2004, http://www.w3.org/TR/xmlschema-2/.

XML Schema Part 1: Structures Second Edition, W3C Recommendation, Oct. 28, 2004,http://www.w3.org/TR/2004/REC-xmlschema-1-20041028/structures.html.

Varlamis, I. et al., "Bridging XML-Schema and Relational Databases. A System for Generating and Manipulating Relational Databases Using Valid XML Documents," Nov. 9-10, 2001, [retrieved on Apr. 26, 2007]. Retreived from the Internet: <URL: http:portal.acm.org/ft_gateway.cfm?id=502203&type=pdf&coll=ACM&CFID=21058823&CFTOKEN=52062648>.

Han, Wook-Shin, et al., "An XML Storage System for Object-Oriented/Object-Relational DBMSs," Journal of Object Technology, vol. 2, No. 3, May-Jun. 2003, pp. 113-126.

Ameri-Yahia, Sihem, et al., A Mapping Schema and Interface for XML Stores, WIDM '02 McLean, VA, Nov. 8, 2002, pp. 23-30.

Banerjee, Sandeepan, et al., "Oracle8i -- The XML Enabled Data Management System," Proc. of the 16th International Conference on Data Engineering, San Diego, CA, Feb. 29 -- Mar. 3, 2000, pp. 561-568.

Tatarinov, Igor, et al., "Storing and Quering Ordered XML using a Relational Database System," ACM Sigmod 2002, Madison, WI, Jun. 4-6, 2002, pp. 204-215.

Amer-Yahia, Shiem, et al., "Logical Physical Support for Heterogeneous Data," CIKM '02, Mclean, VA, Nov. 4-9, 2002, pp. 270-281.

Harold, Elliotte Rusty, "XML Bible," 2nd Edition, Hungry Minds, Inc., New York, NY, Copyright 2001, pp. 2-16, 513, 677-706, 836-841, 848-854 and 871-879.

Morrison, Michael, et al., XML Unleashed, Sam's Publishing, Dec. 1999, pp. 26-36, 214 and 220-223.

Dashofy, Issues in generating data bindings for an XML schema-based language, Department of Information and Computer Science, University of California -- Irvine, 4 pages, http://www.isr.uci.edu/~edashofy/papers/xse2001.pdf. date: Jul. 10, 2001.

Mani, et al., XML to Relational Conversion Using Theory of Regular Tree Grammer, http://www.springerlink.com/app/home/contribution.asp?wasp. date: Jul. 1, 2002.

"Structural Storage of XML Documents, XML Schema and Oracle XML DB," Oracle XML, DB Oracle XML Developer's Guide, 3 pages. date: Jun. 14, 2003.

Modeling XML Schemas as XML, schema tree (XST), 6 pages, http://www.irahul.com/xst02/XSTree.pdf date: Aug. 2002.

McKinnon et al., "XML in 60 Minutes a Day", Wiley Publishing, Inc., Indianapolis, IN, 2003, pp. 164-169 and 300-308.

Amer-Yahia, "Storage Techniques and Mapping Schemas for XML", SIGMOD Record 2003, ACM 2003, pp. 1-8.

Du et al., "ShreX: Managing XML Documents in Relational Databases", Proc. of the 30th VLDB Conf., Toronto, Canada, Aug. 29-Sep. 3, 2004, pp. 1297-1300.

Amer-Yahia et al., "A Comprehensive Solution to the XML-to-Relational Mapping Problem", WIDM 2004, Washington, DC, Nov. 12-13, 2004, pp. 31-38.

Pal et al., "Indexing XML Data Stored in a Relational Database", Proc. of the 30th VLDB Conf., Toronto, Canada, Aug. 29-Sep. 3, 2004, pp. 1146-1157.

* cited by examiner

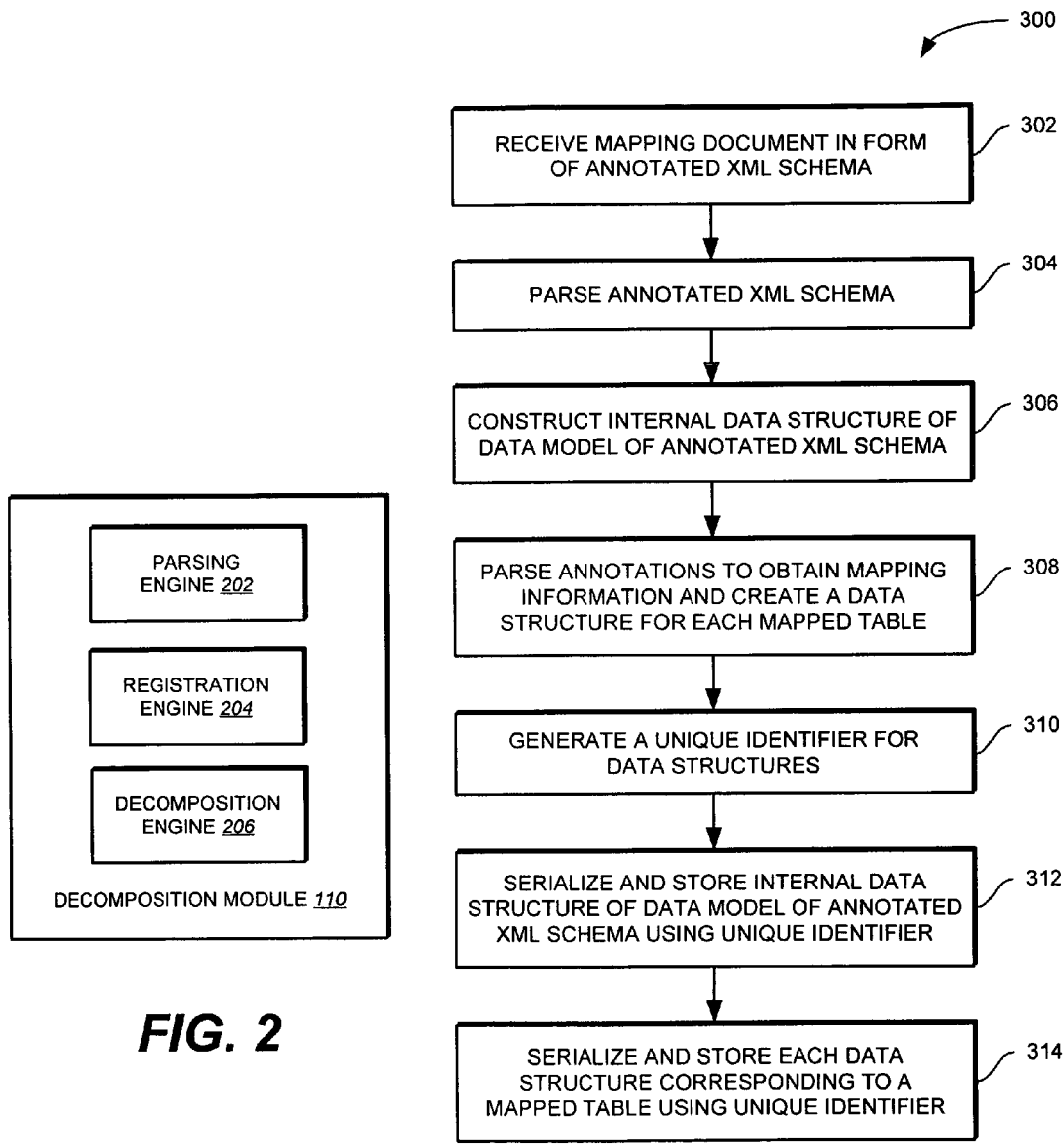

METHOD FOR PRE-PROCESSING MAPPING INFORMATION FOR EFFICIENT DECOMPOSITION OF XML DOCUMENTS

FIELD OF THE INVENTION

The present invention relates generally to databases, and more particularly to pre-processing mapping information for efficient decomposition of an XML document for storage in a database.

BACKGROUND OF THE INVENTION

Databases are computerized information storage and retrieval systems. There are many different types of databases. One particular type of database is a relational database that includes a relational database management system (RDBMS). A relational database management system (RDBMS) is a database management system (DBMS) which uses relational techniques for storing and retrieving data. Relational databases are organized into physical tables which consist of rows and columns of data. The rows are formally called "tuples". A database will typically have many physical tables and each physical table will typically have multiple tuples and multiple columns. The physical tables are typically stored on random access storage devices (DASD) such as magnetic or optical disk drives for semi-permanent storage.

Increasingly, applications are storing XML documents, or parts thereof, in relational databases. An XML document can be stored in a relational database though a process of decomposition—i.e., breaking the XML document into component pieces (or portions) and storing the component pieces in the relational database. The specification of the component pieces and where the component pieces are to be stored in the relational database is typically accomplished through a mapping document. The mapping document contains information as to which XML elements/attributes are mapped to which table and column in the relational database.

On each decomposition operation, along with the XML document to be decomposed, the mapping document is also typically supplied by the user. The mapping document must be parsed to extract mapping information, which must then be processed and transformed into internal data structures for use during the actual decomposition of the XML document. A single mapping document can be used to decompose any instance XML document that conforms to the structure that the mapping document describes. Accordingly, the same mapping document can be used to decompose many XML documents over any time period. Conventional techniques for decomposing an XML document, however, may not save the results of the processing of the mapping document and, therefore, the same processing of the mapping document must be repeated each time a different XML document is decomposed.

Accordingly, what is needed is an improved technique of processing the mapping information which reduces the amount of time required to decompose XML documents. The present invention addresses such a need.

BRIEF SUMMARY OF THE INVENTION

In general, in one aspect, this specification describes a method for pre-processing mapping information for efficient decomposition of an XML document for storage in a database. The method includes receiving a mapping document that describes how all of (or a portion of) the XML document is to be decomposed, transforming the mapping document into a data structure for decomposing the XML document, and making the data structure persistent for use with a subsequent decomposition operation that decomposes an XML document.

Particular implementations can include one or more of the following features. Making the data structure persistent can include storing the data structure in the database. Storing the data structure can include assigning a unique identifier to the data structure, and using the unique identifier to later retrieve the data structure from the database on a subsequent decomposition of any XML document that conforms to the XML schema. Storing the data structure can include storing the data structure as metadata in the database. The mapping document can be in the form of a set of related XML schema documents (also known as a XML schema). The XML schema documents can be augmented with one or more annotations that describe a mapping of XML elements and attributes to the database. Transforming the mapping document can include parsing the XML schema to produce a representation of a data model associated with the XML schema, wherein the data structure represents the data model.

The data structure can include one or more nodes that represent XML schema components including model groups, particles, or element or attribute declarations, and include one or more edges that connect the one or more nodes according to relationships defined in the XML schema. Transforming the mapping document can further include parsing the one or more annotations to obtain the mapping information that maps XML data to the database. The method can further include creating one or more second data structures for each mapped table in the database based on the mapping information. The method can further include assigning a unique identifier to the set of data structures (i.e., the data structure corresponding to the mapping document and the one or more second data structures as a whole) and storing the set of data structures as metadata in the database for use with a subsequent decomposition operation that decomposes any XML document that conforms to the XML schema. In addition, information relating the data structure corresponding to the mapping document with the one or more corresponding second data structures can also be stored. The database can be a relational database.

In general, in another aspect, this specification describes a computer program product, tangibly stored on a computer-readable medium, for pre-processing mapping information for efficient decomposition of an XML document for storage in a database. The product includes instructions to cause a programmable processor to receive a mapping document. The mapping document can be in the form of a set of related XML schema documents (also known as a XML schema). The mapping document describes how portions of the XML document are to be decomposed. The product further includes instructions to transform the mapping document into a data structure for decomposing the XML document, and make the data structure persistent for use with a subsequent decomposition operation that decomposes any XML document that conforms to the XML schema.

In general, in another aspect, this specification describes a decomposition module for pre-processing mapping information for efficient decomposition of an XML document for storage in a database. The decomposition module includes an engine operable to receive a mapping document that describes how portions of the XML document are to be decomposed. The mapping document can be in the form of a set of related XML schema documents. The engine is operable to transform the mapping document into a data structure that can be used for efficient decomposition of the XML document, and make the data structure persistent for use with a subsequent decomposition operation that decomposes any XML document that conforms to the XML schema.

Implementations may provide one or more of the following advantages. The present specification describes techniques for decomposing an XML document that save a significant amount of CPU (processor) cycles as compared to conventional decomposition techniques. Additionally, inadvertent (human) modifications to a mapping document that is supplied to a decomposition operation are avoided, along with subsequent unexplained differences in the expected decomposition results. Since the mapping document is stored in the database, there is a record of the mapping information used to perform a decomposition operation. Such a record can be useful for diagnostics or audit trails.

The details of one or more implementations are set forth in the accompanying drawings and the description below. Other features and advantages will be apparent from the description and drawings, and from the claims.

BRIEF DESCRIPTION OF SEVERAL VIEWS OF THE DRAWINGS

FIG. 2 is a block diagram illustrating the decomposition module of FIG. 1 in accordance with one implementation of the invention.

FIG. 3 illustrates a method for registering a mapping document in accordance with one implementation of the invention.

Like reference symbols in the various drawings indicate like elements.

DETAILED DESCRIPTION OF THE INVENTION

Implementations of the present invention relates generally to databases, and more particularly to pre-processing mapping information for efficient decomposition of an XML document for storage in a database. The following description is presented to enable one of ordinary skill in the art to make and use the invention and is provided in the context of a patent application and its requirements. Various modifications to implementations and the generic principles and features described herein will be readily apparent to those skilled in the art. Thus, the present invention is not intended to be limited to the implementations shown but is to be accorded the widest scope consistent with the principles and features described herein.

Figure 1:
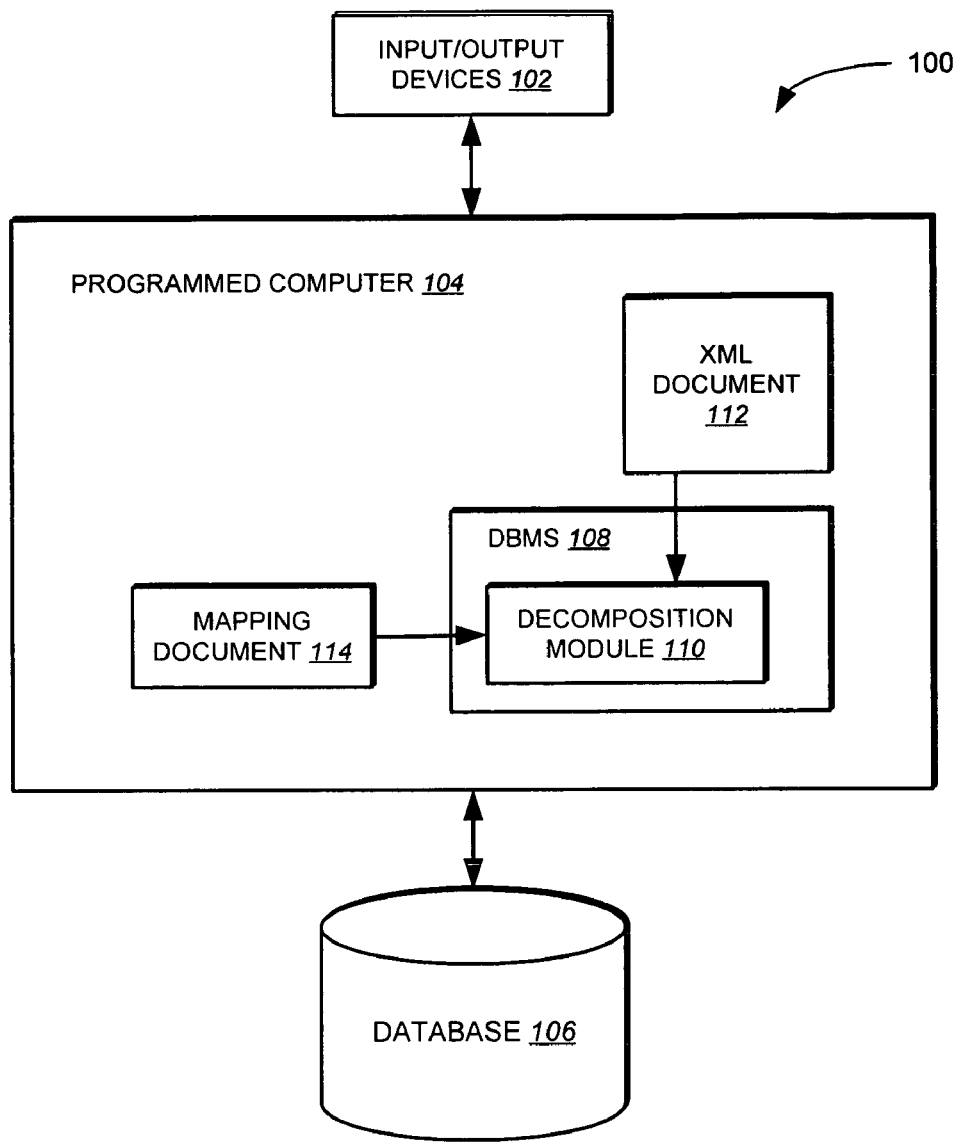
FIG. 1 is a block diagram of a data processing system including a decomposition module in accordance with one implementation of the invention.

FIG. 1 illustrates a data processing system 100 in accordance with one implementation of the invention. Data processing system 100 includes input and output devices 102, a programmed computer 104, and a database 106. Input and output devices 102 can include devices such as a printer, a keyboard, a mouse, a digitizing pen, a display, a printer, and the like. Programmed computer 104 can be any type of computer system, including for example, a workstation, a desktop computer, a laptop computer, a personal digital assistant (PDA), a cell phone, a network, and so on. Database 106 can be a relational database including one or more tables (not shown) for storing data.

Running on programmed computer 104 is a database management system (DBMS) 108 including a decomposition module 110. In one implementation, the database management system (DBMS) 108 and decomposition module 110 are features of DB2 available from International Business Machines, Corporation of Armonk, N.Y. In one implementation, database management system (DBMS) 108 and decomposition module 110 use relational techniques for storing and retrieving XML documents from database 106. Accordingly, in one implementation, decomposition module 110 is operable to receive an XML document 112, decompose XML document 112 into fragmented data, and store the fragmented data internally within database 106.

Decomposition of an XML document is the process of breaking the XML document into component pieces and storing the component pieces in, e.g., a relational database. The specification of the component pieces and where the component pieces are to be stored in the relational database is typically accomplished through a mapping document (e.g., mapping document 114). In one implementation, the mapping document is in the form of a set of related XML schema documents (also known as a XML schema) that describe the structure of conforming XML instance documents. See http://www.w3.org/TR/xmlschema-1/ and http://www.w3.org/TR/xmlschema-2/ for the W3 recommendations for the specification of XML schema, which are incorporated herein by reference. The set of related XML schema documents can be augmented with annotations that describe the mapping of XML components to tables/columns in, e.g., a relational database. Annotations are a feature of XML schema that provide for application-specific information to be supplied to programs processing the schema or instance XML documents. The mapping document minimally contains information as to which XML elements/attributes are mapped to which table and column in, for example, a relational database. Additional information that a mapping document can contain includes: specification of the conditions which the XML element/attribute should satisfy before the XML element/attribute is stored in the relational database; data processing instructions to apply to the XML element/attribute when the XML element/attribute is stored in the relational database; and the cardinality relationship between the attribute sets of the relation.

In one implementation, when decomposition module 110 performs a decomposition operation, decomposition module 110 first receives a mapping document 114 and then later receives an XML document (that is to be decomposed), both of which can be supplied by a user. Decomposition module 110 parses mapping document 114 to extract mapping information, which mapping information is then processed and transformed into internal data structures (discussed in greater detail below) for use during the actual decomposition of XML document 112. Unlike a conventional decomposition module which performs processing on a mapping document to create the internal data structures when each XML document is to be decomposed, decomposition module 110 is operable to perform processing on a mapping document as a separate, distinct user operation, which is referred to herein as registration of the mapping document. The registration operation makes the internal data structures persistent by storing the internal data structures (in one implementation) as metadata in database 106, and returns to the user a unique identifier for the just processed mapping information.

Accordingly, in one implementation, on each decomposition operation the user supplies the unique identifier for the mapping information along with the XML document (e.g., XML document 112) to decomposition module 110. Using the unique identifier, decomposition module 110 reads the persistent metadata from database 106 and restores the internal data structures in a memory of programmed computer 104, after which, the actual decomposition of the XML document begins. As the same mapping document is used to decompose many XML documents over any time period, this alternative saves a significant amount of CPU cycles of repeated work that is typically performed and discarded on each decomposition operation. For smaller XML documents, the time spent processing the mapping document may dwarf the time spent on decomposing the XML documents. This technique also prevents inadvertent modifications to the mapping document that is supplied to the decomposition operation, and subsequent unexplained differences in the expected decomposition results.

FIG. 2 illustrates one implementation of decomposition module 110 in greater detail. As shown in FIG. 2, decomposition module 110 includes a parsing engine 202, a registration engine 204, and a decomposition engine 206. Although three separate engines are shown in FIG. 2 by way of example, the functions associated with each engine can be combined and performed by any number of engines, including a single engine.

In one implementation, parsing engine 202 parses a mapping document to extract mapping information. In one implementation, the mapping document is in the form of a set of related XML schema documents (also known as a XML schema) that are augmented with annotations that describe the mapping of XML components to tables/columns in, for example, a relational database. Annotations are a feature of XML schema that provide for application-specific information to be supplied to programs processing the schema. Parsing engine 202 can comprise a general purpose XML schema processor that generates a representation of the data model for the annotated XML schema documents. In one implementation, the data model is defined by the W3 recommendation http://www.w3.org/TR/2004/REC-xmlschema-1-20041028/structures.html, which is incorporated herein by reference. Parsing engine 202 is further operable to parse annotations (also captured in the data model) to obtain the mapping information. In one implementation, the mapping information comprises information that maps XML data to relational tables and columns.

In one implementation, registration engine 204 constructs a first internal data structure of the data model of the set of related XML schema documents (generated by parsing engine 202). In one implementation, the internal data structure consists of nodes (which represent schema components such as model groups, particles, element or attribute declarations) and edges which connect the nodes according to their relationships in the set of related XML schema documents. In one implementation, registration engine 204 is further operable to create one or more second internal data structures (corresponding to each mapped table) from the mapping information (obtained by parsing engine 202). In one implementation, the second internal data structure consists of nodes that correspond to XML schema element/attribute declarations that have annotations mapping the element/attribute declarations to columns of tables. The mapping information from annotations attached to element/attribute declarations is saved in the corresponding node for efficient processing.

In one implementation, registration engine 204 makes the internal data structures (i.e., the first and second data structures) persistent, storing them as metadata in a database (e.g., database 106) and giving the metadata a unique identifier. For example, registration engine 204 is operable to respectively serialize the first data structure and each instance of the second data structure into its on-disk format and write the serializations into a persistent store in the database that allows for efficient retrieval. In one implementation, the persistent store is a BLOB (Binary Large Object) column in a row of a system catalog table dedicated for each data structure. The catalog table can have an index for efficient retrieval of any specific row. Accordingly, decomposition engine 206 is operable to use the unique identifier to read the persistent metadata from the database, restore the stored internal data structures in memory, and decompose an XML document based on the restored internal data structures.

FIG. 3 illustrates a method 300 for registering a mapping document (e.g., mapping document 114) in accordance with one implementation of the invention. A mapping document is received (e.g., by decomposition module 110), for example, in the form of a set of annotated XML schema documents (also known as a XML schema) (step 302). As discussed above, annotations are a feature of XML schema that provide for application-specific information to be supplied to programs processing the schema or instance documents. The set of annotated XML schema documents is parsed (e.g., by parsing engine 202) (step 304), to generate a representation of a data model for the set of annotated XML schema documents. An internal data structure of the data model of the set of annotated XML schema documents is constructed (e.g., by registration engine 204) (step 306). Annotations associated with the set of annotated XML schema documents are parsed (e.g., by parsing engine 202) to obtain mapping information, and an internal data structure corresponding to each mapped table of a relation database is created (step 308). A unique identifier for the data structures is generated (e.g., by registration engine 204) (step 310). The internal data structure of the data model of the set of annotated XML schema documents is serialized and stored (e.g., by registration engine 204) (step 312). Each internal data structure corresponding to each mapped table is also serialized and stored (e.g., by registration engine 204) (step 314). In addition, the information necessary to relate the internal data structure of the data model of the set of annotated XML schema documents with the internal data structures of each mapped table is also stored. In one implementation, the unique identifier is assigned to metadata represented by these internal data structures. Accordingly, the internal data structures are persisted for use in subsequent decomposition operations.

Figure 4:
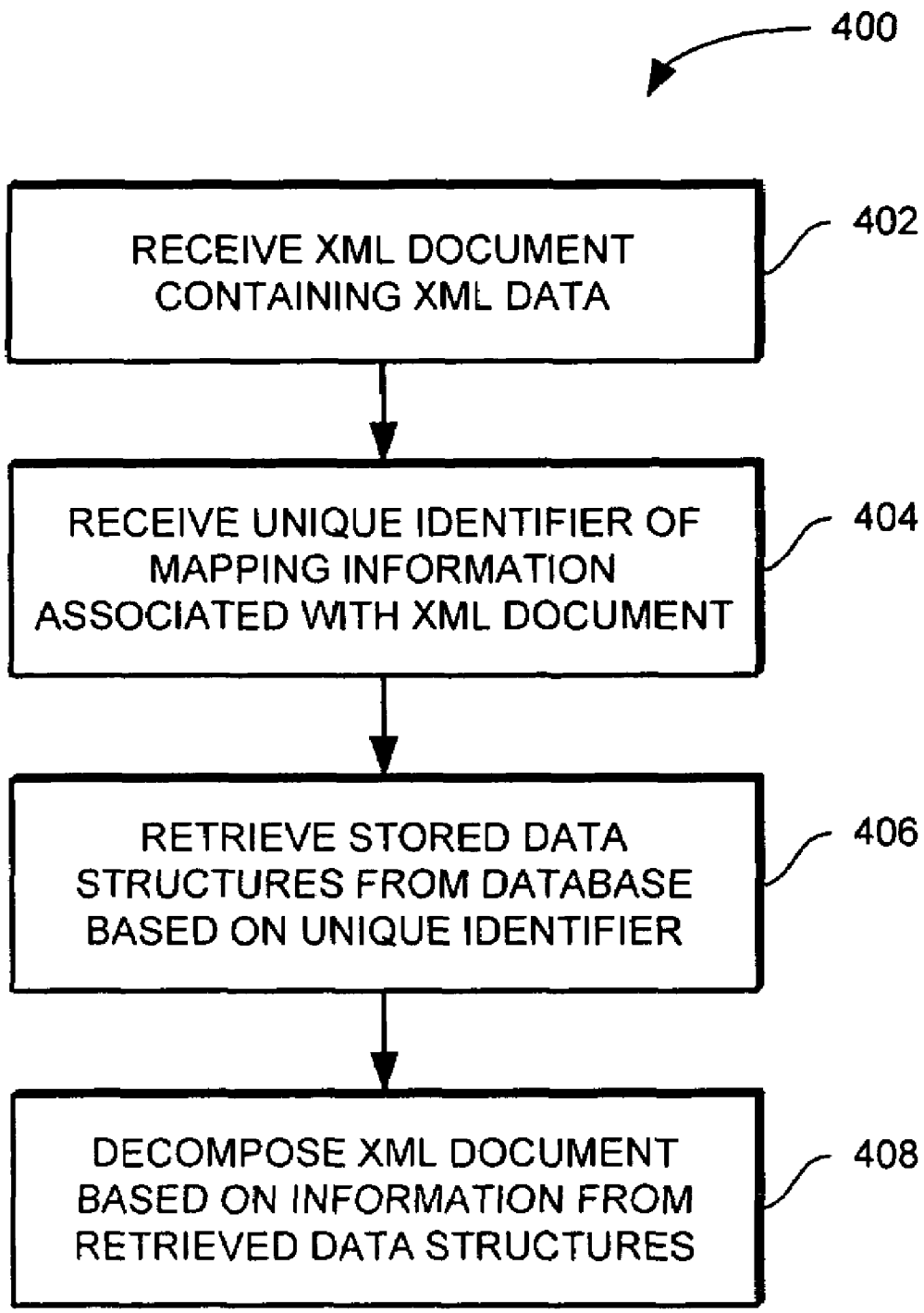
FIG. 4 illustrates a method for decomposing an XML document in accordance with one implementation of the invention.

FIG. 4 illustrates a method 400 for decomposing an XML document (e.g., using decomposition engine 206) in accordance with one implementation of the invention. An XML document containing XML data is received (e.g., by decomposition module 110) (step 402). A unique identifier for mapping information associated with the XML document is received (e.g., by registration engine 204) (step 404). Stored internal data structures are retrieved (e.g., by registration engine 204) based on the unique identifier (step 406). The XML document is then decomposed (e.g., by decomposition engine 206) based on the rules embedded in the internal data structures retrieved from the database (step 408).

One or more of method steps described above can be performed by one or more programmable processors executing a computer program to perform functions by operating on input data and generating output. Generally, the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Figure 5:
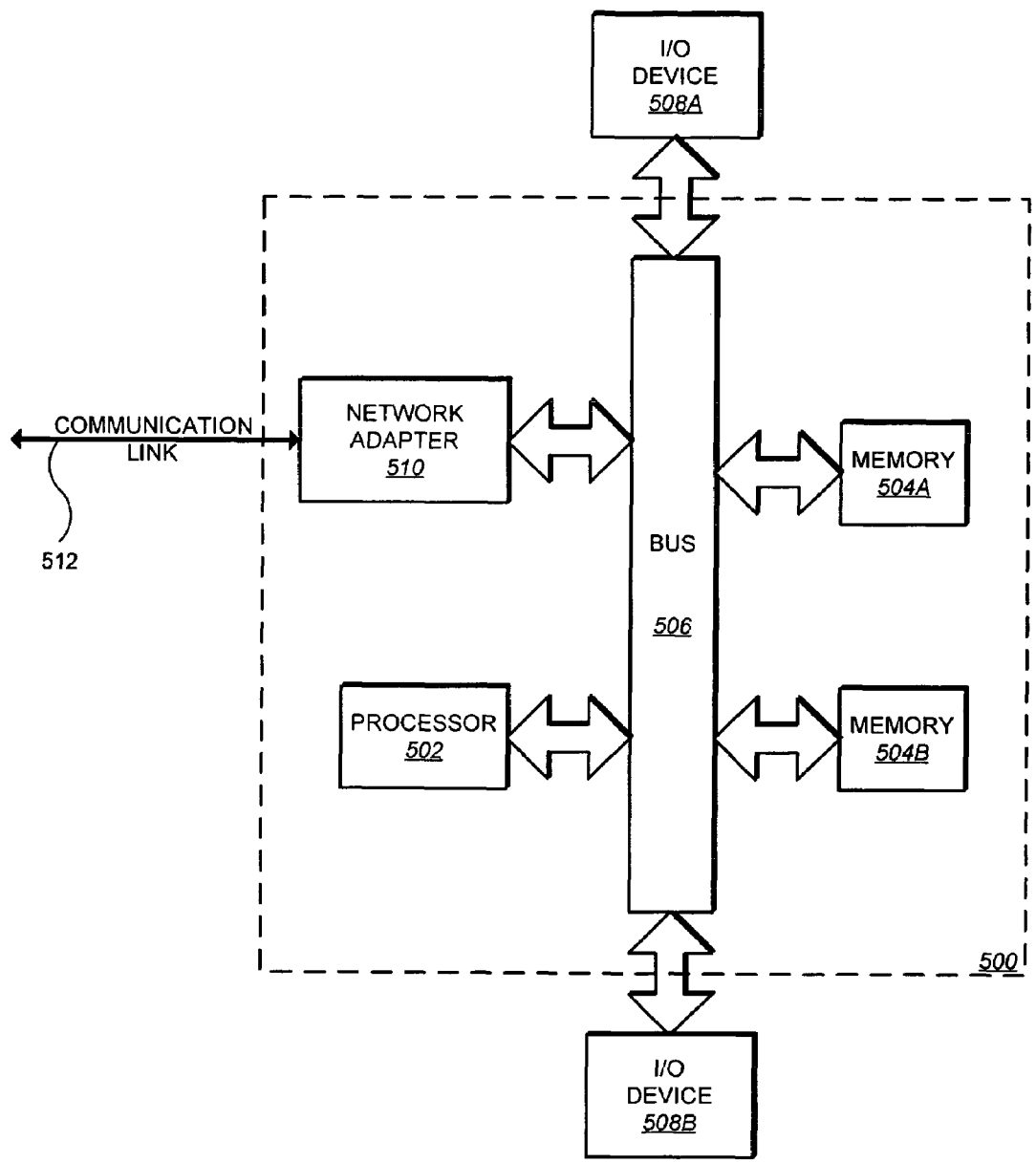
FIG. 5 is a block diagram of a data processing system suitable for storing and/or executing program code in accordance with one implementation of the invention.

FIG. 5 illustrates a data processing system 500 suitable for storing and/or executing program code. Data processing system 500 includes a processor 502 coupled to memory elements 504A-B through a system bus 506. In other embodiments, data processing system 500 may include more than one processor and each processor may be coupled directly or indirectly to one or more memory elements through a system bus.

Memory elements 504A-B can include local memory employed during actual execution of the program code, bulk storage, and cache memories that provide temporary storage of at least some program code in order to reduce the number of times the code must be retrieved from bulk storage during execution. As shown, input/output or I/O devices 508A-B (including, but not limited to, keyboards, displays, pointing devices, etc.) are coupled to data processing system 500. I/O devices 508A-B may be coupled to data processing system 500 directly or indirectly through intervening I/O controllers (not shown).

In the embodiment, a network adapter 510 is coupled to data processing system 500 to enable data processing system 500 to become coupled to other data processing systems or remote printers or storage devices through communication link 512. Communication link 512 can be a private or public network. Modems, cable modems, and Ethernet cards are just a few of the currently available types of network adapters.

Various implementations for decomposing an XML document for storage in a database have been described. Nevertheless, one or ordinary skill in the art will readily recognize that there that various modifications may be made to the implementations, and any variation would be within the spirit and scope of the present invention. For example, the steps of methods discussed above can be performed in a different order to achieve desirable results. In addition, one or more aspects of the invention (e.g., pre-processing of mapping information and making the results of the processing persistent) can apply to technologies other than databases. Furthermore, the target specified in the mapping information can be targets other than entities in a database. Additionally, database 106 can be a database other than a relational database, such as a hierarchical database, or other type of database. Accordingly, many modifications may be made by one of ordinary skill in the art without departing from the spirit and scope of the following claims.

What is claimed is:

1. A computer implemented method, the method implemented on a processor and a memory programmed for decomposing an XML document for storage in a relational database, the method comprising:
   receiving a mapping document, the mapping document describing components of the XML document that are to be decomposed, the mapping document being in the form of a set of related XML schema documents augmented with at least one annotation that describes a mapping of the components to specified relational tables and columns in the relational database;
   transforming the mapping document into a first data structure and at least one second data structure for decomposing the XML document, the transforming comprising:
      i) parsing the set of related XML schema documents to produce the first data structure, the first data structure representing a data model associated with the set of related XML schema documents, wherein the first data structure comprises:
         a) at least one node that represents schema components comprising model groups, particles, and element and attribute declarations, and
         b) at least one edge that connect the at least one node according to relationships defined in the set of related XML schema documents; and
      ii) parsing the at least one annotation to obtain mapping information that maps the components to the specified relational tables and columns in the database; and
      iii) creating the at least one second data structure, each of the at least one second data structures being created for a corresponding mapped relational table in the relational database based on the mapping information; and
   making the first and second data structures persistent for use with a subsequent decomposition operation that decomposes the XML document, wherein making the data structure persistent includes storing the first and second data structures in the database,
   wherein storing the first and second data structures comprises assigning and storing a unique identifier to the first and second data structures, the unique identifier used in later retrieving the first and second data structures from the database for a subsequent decomposition of a second XML document in response to receiving the unique identifier, such that the retrieved first and second data structures can be used and need not be transformed from a second mapping document for the second XML document.

2. The method of claim 1, further wherein storing the first and second data structures comprises storing the first and second data structures as metadata in the database.

3. The method of claim 1, wherein the components of the XML documents include XML elements and attributes.

* * * * *